(12) United States Patent
Bartlett et al.

(10) Patent No.: US 12,353,567 B2
(45) Date of Patent: Jul. 8, 2025

(54) DRIVE CRYPTOGRAPHIC VALUE MANAGEMENT

(71) Applicant: International Business Machines Corporation, Armonk, NY (US)

(72) Inventors: Eric John Bartlett, Chard (GB); Dominic Tomkins, Alton (GB); Miles Mulholland, Eastleigh (GB); Alex Dicks, Winchester (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 387 days.

(21) Appl. No.: 17/938,337

(22) Filed: Oct. 6, 2022

(65) Prior Publication Data
US 2024/0119162 A1 Apr. 11, 2024

(51) Int. Cl.
*G06F 21/60* (2013.01)
*G06F 3/06* (2006.01)

(52) U.S. Cl.
CPC .......... *G06F 21/602* (2013.01); *G06F 3/0604* (2013.01); *G06F 3/0622* (2013.01); *G06F 3/064* (2013.01); *G06F 3/0689* (2013.01)

(58) Field of Classification Search
CPC .... G06F 21/602; G06F 3/0604; G06F 3/0622; G06F 3/064; G06F 3/0689
USPC ......................................................... 713/193
See application file for complete search history.

(56) References Cited

U.S. PATENT DOCUMENTS

| | | | | |
|---|---|---|---|---|
| 9,152,502 B2* | 10/2015 | Kalach | ................ | G06F 11/1435 |
| 10,761,758 B2* | 9/2020 | Doerner | ................ | G06F 3/0689 |
| 2008/0091761 A1* | 4/2008 | Tsao | ........................ | H04L 51/04 |
| | | | | 709/201 |
| 2011/0055471 A1* | 3/2011 | Thatcher | ............... | G06F 3/0679 |
| | | | | 711/216 |
| 2012/0151224 A1* | 6/2012 | Koifman | ................ | H04L 69/04 |
| | | | | 713/193 |
| 2015/0347057 A1* | 12/2015 | Busick | .................. | G06F 3/0632 |
| | | | | 710/74 |
| 2016/0246537 A1* | 8/2016 | Kim | ..................... | G06F 11/1076 |
| 2020/0341907 A1* | 10/2020 | Shveidel | ............... | G06F 3/0604 |
| 2021/0334206 A1* | 10/2021 | Colgrove | ............ | G06F 12/1009 |

(Continued)

OTHER PUBLICATIONS

Gordon F; Reliability and Security of RAID Storage Systems and D2D Archives Using SATA Disk Drives; ACM:2005; pp. 95-107.*

(Continued)

*Primary Examiner* — Monjur Rahim
(74) *Attorney, Agent, or Firm* — Rakesh Roy

(57) ABSTRACT

A method, system, and computer program product for managing a storage array in a storage system, the storage array comprising a first and second data blocks comprising: receiving a set of cryptographic values from the storage array, the set comprising a first value associated with the first data block, and a second value associated with the second data block; analysing the set of cryptographic values to determine a set of associations, the set of associations comprising a first association between the first data block and the second data block, storing the set of associations; and in response to determining the set of associations, performing a storage management operation on at least one of the first data block and the second data block.

20 Claims, 9 Drawing Sheets

(56) References Cited

U.S. PATENT DOCUMENTS

2022/0035734 A1* 2/2022 Harel ................ G06F 12/0868

OTHER PUBLICATIONS

Mell et al., "The NIST Definition of Cloud Computing", Recommendations of the National Institute of Standards and Technology, NIST Special Publication 800-145, Sep. 2011, 7 pages.

* cited by examiner

| INDEX | DISK | BLOCK LBA | HASH VALUE $H_x$ | PARAMETERS | ASSOCIATION | STALE? |
|---|---|---|---|---|---|---|
| 1 | 610 | N | X | A, B, C, D | 3 (612) | NO |
| 2 | 610 | S | Y | B, E, F, G | 2 (610) ↕ | NO |
| 3 | 612 | T | X | C, D, H, J | 1 (610) | NO |
| 4 | 614 | Z | X | C, L, M, P | 4 (614) | NO |

FIG. 8

DRIVE CRYPTOGRAPHIC VALUE MANAGEMENT

TECHNICAL FIELD

The invention is generally directed to storage. In particular it provides a method, system, and computer program product suitable for managing a storage array in a storage system.

BACKGROUND ART

Many computer systems use a redundant array of independent disks (RAID) for data storage purposes. This allows for improved data transfer rates over a single disk access, and also provides error correction, data protection and drive redundancy.

RAID systems are disk array storage systems created to provide large storage areas, fast access times and rate, and also redundancy for data protection. For example, data can be mirrored across two or more disks, so if one disk fails, the data is available from the remaining disks. Alternatively, data can be spread over multiple disks allowing concurrent reading of data. Data parity can also be provided in a further drive, so if one drive fails, data can be recreated from the remaining drives. RAID systems are controlled by a RAID controller, which is a hardware unit that configures a RAID array and provides a RAID layer, so that to a using computer system, a disk array appears as a logical, single disk.

Within a RAID array system there is typically spare capacity or drives that can be used when there is a problem with one or more of the array member drives. This spare capacity can be used for spare takeover when one drive fails as the new drive capacity can be written to, using a data read from the other RAID member drives as part of the array rebuild process.

Hashing is a programming method in which a string of data is transformed into a smaller, fixed size data value, known as 'key' or a 'hash value'. Hashing is often used to index data, because finding a hash value is quicker than finding the string of data. A 'hash function' is an algorithm that creates the hash value from the string of data. Hash functions are one-way in that the string of data cannot be discovered from the hash value. Hash functions generally create a unique hash value. Hash functions used for storage systems have an extremely low likelihood of hash collisions, leading to an assumption that hash values will be different for different data.

Common hash functions are MD5 and SHA1. No matter how large the string of data is, the hash function produces a hash value of the same size MD5 produces a hash value with a 128 bit size, and SHA1 produces a hash value with a 160 bit size.

Deduplication methods can be based on hashing the data written to identify matches to data ranges previously written by matching the hash value to that stored in metadata (commonly the hashes are stored in the form of a Log Structured Array). Rather than consuming more media on the storage device by performing a write to the media the device's metadata can be updated to increase the reference count for the data hash and achieve deduplication space savings.

As with other storage technologies like compression and encryption, deduplication technologies can be introduced into flash drives and consumed by a RAID layer that composes the drives into an array with a specific RAID level to improve reliability and or performance. RAID arrays are built using drives with the same storage characteristics and so it is possible to conceive of the drive specification for an array (for example the Field Replaceable Unit (FRU) replacement specification etc.) to include the specification of the deduplication hash method running on the drives. This common drive duplication hash environment generates new opportunities for the RAID layer to improve reliability.

Drives can also support an 'unmap' function to indicate to the drive that specified logical block array (LBA) ranges are no longer needed. Therefore, the RAID layer can issue unmaps to free up drive physical capacity. This offers a method by which the RAID layer can manage the physical capacity provision within the drives based on which array capacity is presently being used by the storage system.

In an enterprise storage system, the same data can often be stored in multiple places. In RAID 1, such duplication is intentional so as to provide data redundancy. However, in some cases, duplication is unintentional leading to inefficient use of physical disks.

In some systems, duplicate data can be removed with a deduplicate operation. In computer science, 'deduplication' is the elimination of duplicate or redundant information. Deduplication comprises deleting duplicate data. Pointers and references also need updating to reference to the remaining data instance. In RAID systems, the identification of duplicate data and the updating of references are especially difficult, because the nature of RAID inherently applies a layer of abstraction to the location of a particular data block Conversely, when improved data integrity is desired, there is a need to identify data regions that display a single point of failure.

Therefore, there is a need in the art to address the aforementioned problem.

SUMMARY OF INVENTION

According to the present invention there are provided a method, a system, and a computer program product according to the independent claims.

Viewed from a first aspect, the present invention provides A computer implemented method for managing a storage array in a storage system, the storage array comprising a first data block and a second data block, the method comprising: receiving a set of cryptographic values from the storage array, the set comprising a first value associated with the first data block, and a second value associated with the second data block; analysing the set of cryptographic values to determine a set of associations, the set of associations comprising a first association between the first data block and the second data block, the step of analysing comprising: comparing the first value with the second value; in response to identifying that the first value equals the second value, determining that the first association is an equality association; and in response to identifying that the first value is unique, determining that the first association is a null association; storing the set of associations; in response to determining the set of associations, performing a storage management operation on at least one of the first data block and the second data block.

Viewed from a further aspect, the present invention provides a system comprising a system for managing a storage array in a storage system, the storage array comprising a first data block and a second data block, the system comprising: a memory; at least one processor in communication with memory; and program instructions executable by one or more processor via the memory to perform a method comprising: receiving a set of cryptographic values from the storage array, the set comprising a first value associated with the first data block, and a second value associated with the second data block; analysing the set of cryptographic values to determine a set of associations, the set of associations comprising a first association between the first data block and the second data block, the step of analysing comprising: comparing the first value with the second value; in response to identifying that the first value equals the second value, determining that the first association is an equality association; and in response to identifying that the first value is unique, determining that the first association is a null association; storing the set of associations; in response to determining the set of associations, performing a storage management operation on at least one of the first data block and the second data block.

Viewed from a further aspect, the present invention provides a computer program product for managing a storage array in a storage system, the storage array comprising a first data block and a second data block, comprising: a computer readable storage medium readable by one or more processing circuit and storing instructions for execution by one or more processor for performing a method comprising: receiving a set of cryptographic values from the storage array, the set comprising a first value associated with the first data block, and a second value associated with the second data block; analysing the set of cryptographic values to determine a set of associations, the set of associations comprising a first association between the first data block and the second data block, the step of analysing comprising: comparing the first value with the second value; in response to identifying that the first value equals the second value, determining that the first association is an equality association; and in response to identifying that the first value is unique, determining that the first association is a null association; storing the set of associations; in response to determining the set of associations, performing a storage management operation on at least one of the first data block and the second data block.

Viewed from a further aspect, the present invention provides a computer program product for managing a storage array in a storage system, the computer program product comprising a computer readable storage medium readable by a processing circuit and storing instructions for execution by the processing circuit for performing a method for performing the steps of the invention.

Viewed from a further aspect, the present invention provides a computer program stored on a computer readable medium and loadable into the internal memory of a digital computer, comprising software code portions, when said program is run on a computer, for performing the steps of the invention.

Preferably, the present invention provides a method, system and computer program product, wherein in response to the first association being a null association, the storage management operation comprises, in response to the storage array not being redundant, copying the first data block to a spare storage area of the storage system.

Preferably, the present invention provides a method, system and computer program product, wherein in response to the first association being an equality association, the storage management operation comprises, in response to the first data block not being available, rebuilding the first data block from the second data block. Advantageously, this allows a RAID rebuild due to a loss of drive, for example through a drive or network failure.

Preferably, the present invention provides a method, system and computer program product, wherein the spare storage area is chosen from a list, the list comprising: a device of the storage system with a most spare capacity of the storage system; a device of the storage system with a best write endurance metric of the storage system; and a device of the storage system with the lowest workload of the storage system.

Preferably, the present invention provides a method, system and computer program product, wherein the first spare storage area is chosen from a list, the list comprising: a device of the storage system with a most spare capacity of the storage system; a device of the storage system with a best write endurance metric of the storage system; and a device of the storage system with a lowest workload of the storage system.

Preferably, the present invention provides a method, system and computer program product, wherein the first data block resides on a first device of the storage array, and the second data block resides on a second device of the storage array, and wherein both the first value and second value are unique, the method further comprising, in response to the first device and the second device being predicted to fail, prioritising copying from the first device or the second device based on a metric list, the list comprising how long ago failure was predicted, and how many unique hashes the first device and the second device are associated with.

Preferably, the present invention provides a method, system and computer program product, further comprising, in response to a device of the storage array being predicted to fail, storing the set of cryptographic values are stored in a database.

Preferably, the present invention provides a method, system and computer program product, wherein the storage array comprises a third data block and the set of cryptographic values comprises a third value associated with the third data block, wherein the first data block and the second data block are stored on a first device of the system, and the third data block is stored on a second device of the system, wherein the first value is unique, and the second value equals the third value, the method further comprising: copying the first data block to a first spare storage of the storage system before copying the second data block to a second spare storage of the storage system.

Preferably, the present invention provides a method, system and computer program product, wherein the cryptographic key comprises at least one of a list, the list comprising a hash value and an error correcting code value.

Preferably, the present invention provides a method, system and computer program product, wherein the drive array comprises at least one of a list, the list comprising a RAID array, and a JBOD array.

Advantageously, by using cryptographic values, such as hash values, block duplications and/or uniqueness are identified much more quickly than if data blocks were compared. This leads to improved reliability of RAID array in terms of proactive space management, creating multiple copies of unique hash data on drives, and faster rebuild times etc.

Advantageously, the invention adds awareness of deduplicating drive hash population into the RAID controller, adds an ability to manage drive hash population for improved RAID reliability, providing methods to build metadata to link drive hashes and for the RAID controller to create and manage external references to drive hashes for these purposes.

Advantageously, this invention extends the RAID array's reliability characteristic for written data by assuming that if a drive's data within a hash block LBA range is not overwritten, the hash for that block is stable and still exists on that drive. With this knowledge the RAID controller manages the copies of the hash on the drive population within the array by creating array metadata to contain references between blocks on drives with the same hash.

Advantageously, the hash metadata knowledge improves reliability by either adding awareness of additional hash data copies and redundancy on multiple drives, or as a method to speed up rebuild of a failing drive by using hashes to bypass full rebuild input/output (I/O) operations.

Advantageously, the drive hashes stored for discrete same grain sized regions of drive LBA space are utilised to improve reliability, accessibility, and serviceability (RAS) characteristics. An example of a workable region to use in this respect is a drive 'strip'. An example size of strip is 256 kB, but other sizes are also suitable. Assuming the storage system drives all use the same hash algorithm, and that there are no hash collisions this makes the drive hash for one drive region equivalent to the same hash another region on a different drive with the same hash.

Advantageously, a management policy can be established to ensure that there are always multiple drives with a given hash, so that drive loss can be protected against.

Advantageously, the present invention supports recovery of data, which could be lost due to drive failure using optimisation of, or duplication of unique source data to improve the RAID reliability characteristics.

BRIEF DESCRIPTION OF THE DRAWINGS

The present invention will now be described, by way of example only, with reference to preferred embodiments, as illustrated in the following figures:

FIG. 8 depicts a high-level exemplary schematic diagram 800 depicting a metadata store 508, according to a preferred embodiment of the present invention.

DETAILED DESCRIPTION

Figure 1:
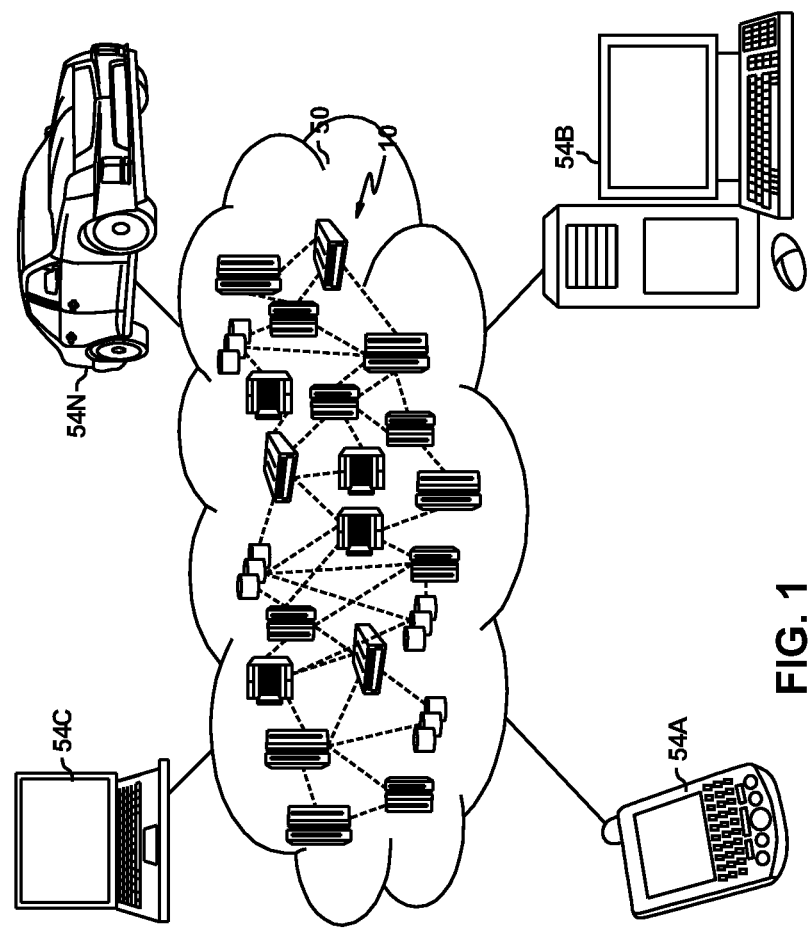
FIG. 1 depicts a cloud computing environment according to an embodiment of the present invention.

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Moreover, the same or similar reference numbers are used throughout the drawings to denote the same or similar features, elements, or structures, and thus, a detailed explanation of the same or similar features, elements, or structures will not be repeated for each of the drawings. The terms "about" or "substantially" as used herein with regard to thicknesses, widths, percentages, ranges, etc., are meant to denote being close or approximate to, but not exactly. For example, the term "about" or "substantially" as used herein implies that a small margin of error is present. Further, the terms "vertical" or "vertical direction" or "vertical height" as used herein denote a Z-direction of the Cartesian coordinates shown in the drawings, and the terms "horizontal," or "horizontal direction," or "lateral direction" as used herein denote an X-direction and/or Y-direction of the Cartesian coordinates shown in the drawings.

Additionally, the term "illustrative" is used herein to mean "serving as an example, instance or illustration." Any embodiment or design described herein is intended to be "illustrative" and is not necessarily to be construed as preferred or advantageous over other embodiments or designs.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
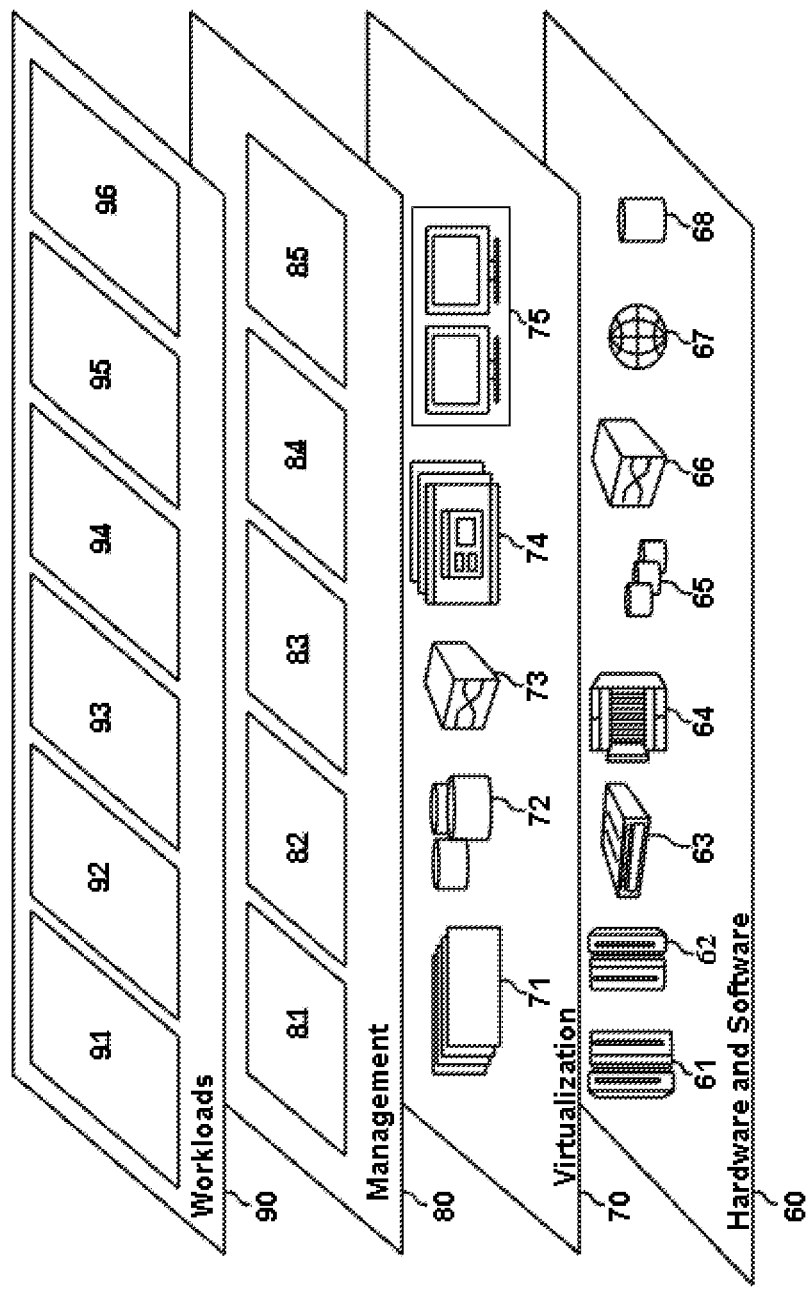
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. Other examples of virtual storage (not depicted in FIG. 2) are those described by the embodiments of FIGS. 3-8 used to illustrate the invention.

In one example, management layer 80 may provide the functions described below. Resource provisioning 81 provides dynamic procurement of computing resources and other resources that are utilized to perform tasks within the cloud computing environment. Resource provisioning 81 may comprise a service component 501 of the invention. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

There are a number of RAID architectures, depending on the required balance between fault tolerance and performance. These architectures are known as 'levels'. In RAID level 0, data blocks are striped across a disk array without any faut tolerance. In RAID level 1, data is mirrored across two disks. In RAID level 10, is a combination of RAID 1 and RAID 0, using mirroring and striping. In RAID 5, data blocks are striped across the drives and on one drive a parity checksum of all the block data is written. The parity data are not written to a fixed drive, they are spread across ail drives. If a disk fails, data can be recovered using the remaining block data and the block. In RAID level 6 data blocks and also dual parities are striped across the drives. RAID 6 can handle dual disk failures.

There are also other RAID levels that can be used. In RAID level 2, data bits are striped across a set of data disks, and error correction codes are written to redundancy disks. In RAID level 3 data bytes are striped across a set of data drives, and parity values are written to parity drives. In RAID level 4 data blocks are striped across a set of data drives, and parity values are written to parity drives. Additionally, other combinations of RAID are possible, such as RAID15, which is a combination of RAID 1 and RAID 5. On each physical drive data is stored in predefined blocks of data generally having the same size. A predefined number of blocks of data, and any appropriate parity information are mapped to define a stripe of data, which is distributed across the RAID array elements. A typical size of strip is 8 k to 64 k bytes. A "stripe" is a group of corresponding stripe units.

A logical unit number (LUN) is a unique identifier for identifying a collection of physical or logical storage. A LUN can reference a single drive, a partition of drives, or an entire RAID array. Logical block addressing (LBA) is a method for specifying a location of blocks of data on storage devices.

Small Computer System Interface (SCSI) a set of command set standards for physically connecting and transferring data between computers and peripheral devices, such as drives. The skilled person would understand that there are other command sets. SCSI is available in a number of interfaces, for example, SSA, 1 Gbit Fibre Channel (1GFC), SAS. SCSI can be parallel or serial.

In the storage subsystems of IBM® DS8000 series, IBM Storwize®, and IBM FlashSystem, the SAS protocol is used for the internal disks. The storage subsystems have controllers that provide the required hardware adapters for host connectivity to the subsystem. RAID adapters are used to create a virtual disk or logical unit number (LUN) that is configured in one of the supported RAID levels with multiple SAS hard disks based on the level of RAID used. Various levels of RAID of available to configure internal SAS HDDs or SDDs. IBM, DS8000, and Storwize are trademarks of International Business Machines Corporation, registered in many jurisdictions worldwide.

The following RAID levels are supported:
RAID 0 Data striped across one or more drives, no redundancy
RAID 1 Data is mirrored between two drives
RAID 5 Data is striped across a minimum of three drives with one rotating parity
RAID 6 Data is striped across a minimum of five drives with two rotating parities
RAID 10 Data is striped across pairs of mirrored drives, with a minimum of two drives RAID arrays can be configured using a hardware adapter. This is termed 'hardware RAID'. RAID arrays can also be configured using operating system software. This is termed 'software RAID'.

In storage systems, data can be lost if a drive that the data is stored on fails. With fault tolerant RAID levels, for example, RAID 1, RAID 5 and RAID 6, such data can be recovered from remaining drives and re-written to a repaired drive or to a spare drive. The array is said to be "rebuilt".

A RAID controller, or 'disk array controller' is a device that manages the physical drives and presents them to the computer as logical units. The RAID controller has a front-end interface to a computer system's host adapter. An example of an interface is SCSI. The RAID controller also has a back-end interface for communicating with underlying drives. Again, an example of an interface is SCSI. RAID controllers carry out numerous functions in addition to RAID management and I/O functionality. Examples are controller failover, and array copy services.

JBOD (Just a Bunch of Disks) is another architecture that uses an array of multiple disks. These can be made available to the overlying system as a set of independent drives, or as a spanned single volume without RAID technology.

In a storage system there are many levels of abstraction. A storage drive manages physical placement of data blocks onto the drive media. In-built functionality handles data block placement. For example, a disk drive can identify media errors, and can therefore relocate blocks to appropriate media positions, whilst still presenting a logical contiguous block space to upstream storage controllers.

Consider a RAID 5 array, which comprises a 'stride' length of 5 blocks. The stride comprises 4 data blocks and a parity block. Writing of a file comprises caching data in the RAID controller. The RAID controller calculates a parity value for 4 data blocks of the file at a time. A first 'stripe' P of 5 blocks is written to a drive array: a first data block of P to drive N, a second data block of P to drive N+1, a third data block of P to drive N+2, a fourth data block of P to drive N+3, and parity value of P to drive N+3. In a rotating system, a subsequent 'stripe' of blocks P+1 is written to a drive array starting this time with a first data block of P+1 to drive N+1, second first data block of P+1 to drive N+1, a third data block of P+1 to drive N+2, a fourth data block of P+1 to drive N+3, with the parity value of P+1 written to drive N. Data and parity are rotated around the 5 drive array. An advantage of rotating writes is to even out disk writes.

When a disk fails in a RAID 5 array, a data block of a stride can be rebuilt using the stride blocks on disks that are not failing. For example, if drive N fails in the above example, the second, third, and fourth data blocks of stripe P are XOR'd with the parity bit of drive N+3 to recover the data block N of stripe P.

Figure 3:
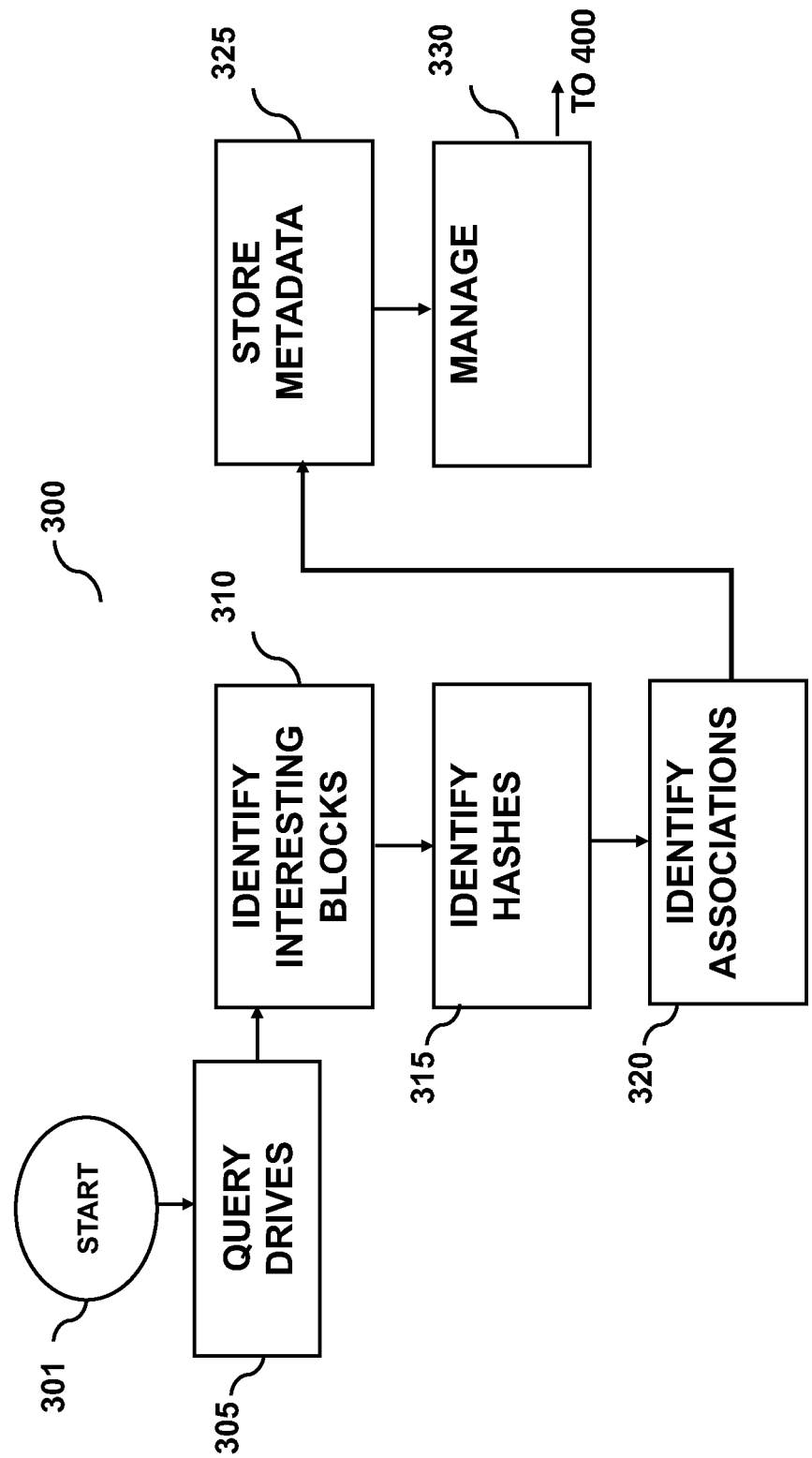
FIG. 3 depicts a high-level exemplary schematic flow diagram 300 depicting operation methods steps for processing hash values in a storage array, according to a preferred embodiment of the present invention.

FIG. 3, which should be read in conjunction with FIGS. 4 to 8, is a high-level exemplary schematic flow diagram 300 depicting operation methods steps for processing hash values in a storage array, according to a preferred embodiment of the present invention.

Figure 4:
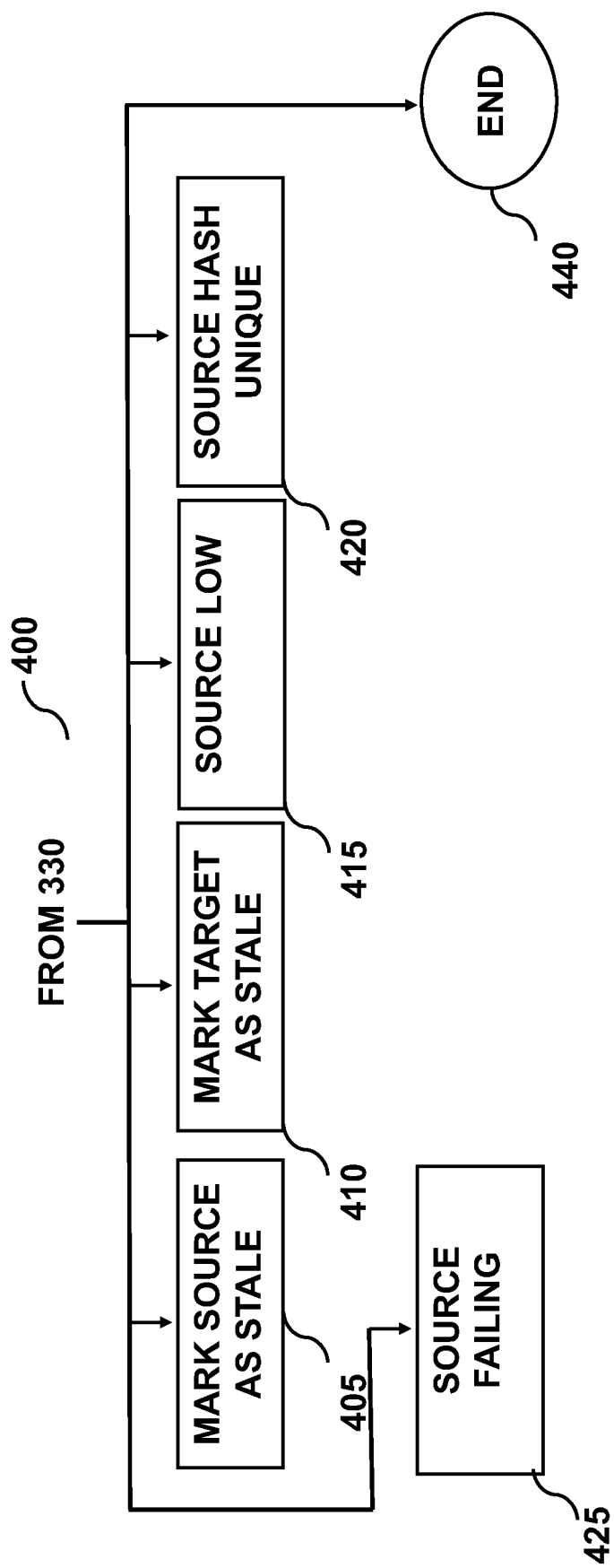
FIG. 4 depicts a high-level exemplary schematic flow diagram 400 depicting operation methods steps for managing hash values in a storage array, according to a preferred embodiment of the present invention.

FIG. 4 depicts a high-level exemplary schematic flow diagram 400 depicting operation methods steps for managing hash values in a storage array, according to a preferred embodiment of the present invention.

Figure 5:
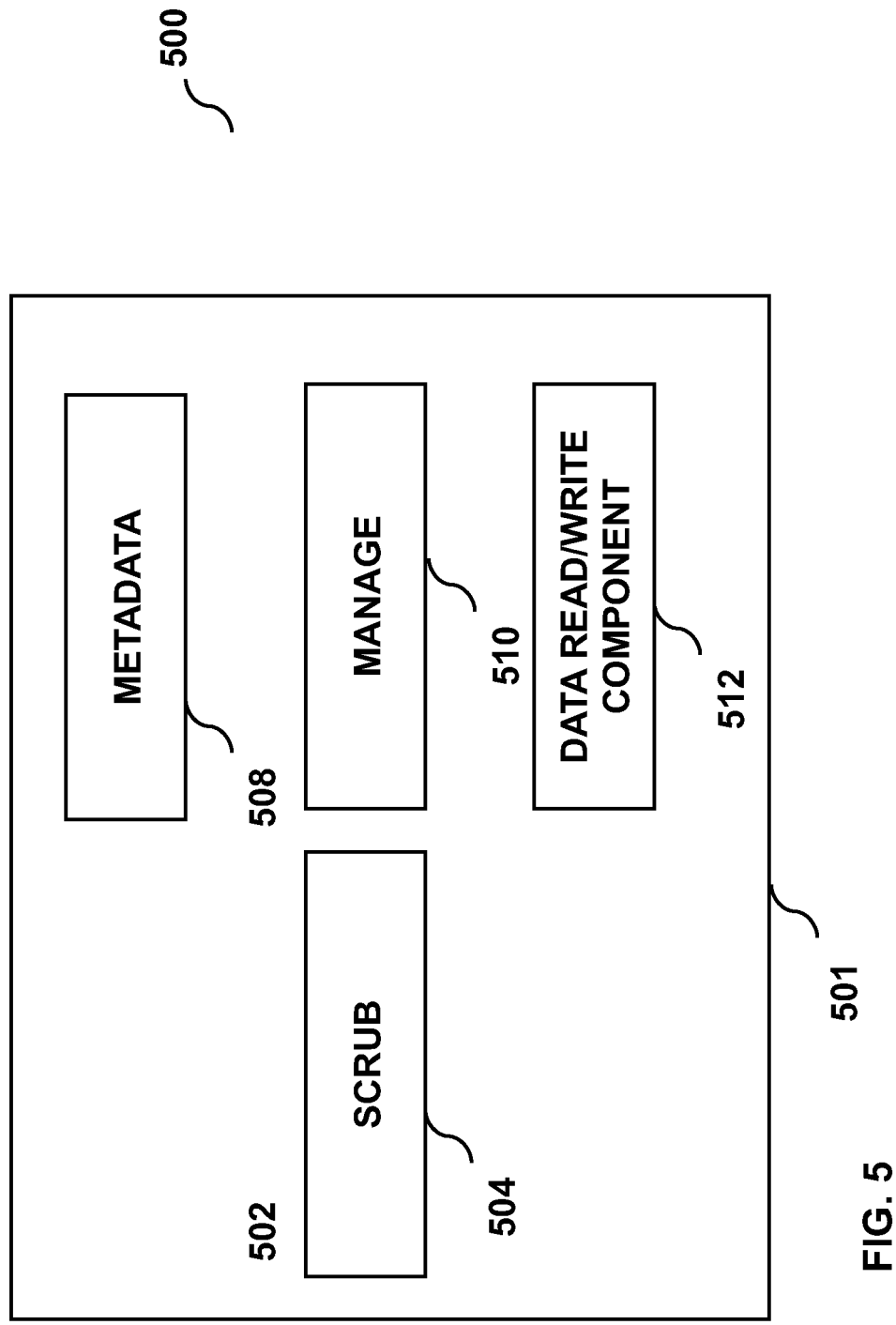
FIG. 5 depicts a high-level exemplary schematic diagram 500 depicting a RAID controller, according to a preferred embodiment of the present invention.

FIG. 5 depicts a high-level exemplary schematic diagram 500 depicting a RAID controller, according to a preferred embodiment of the present invention.

Figure 6:
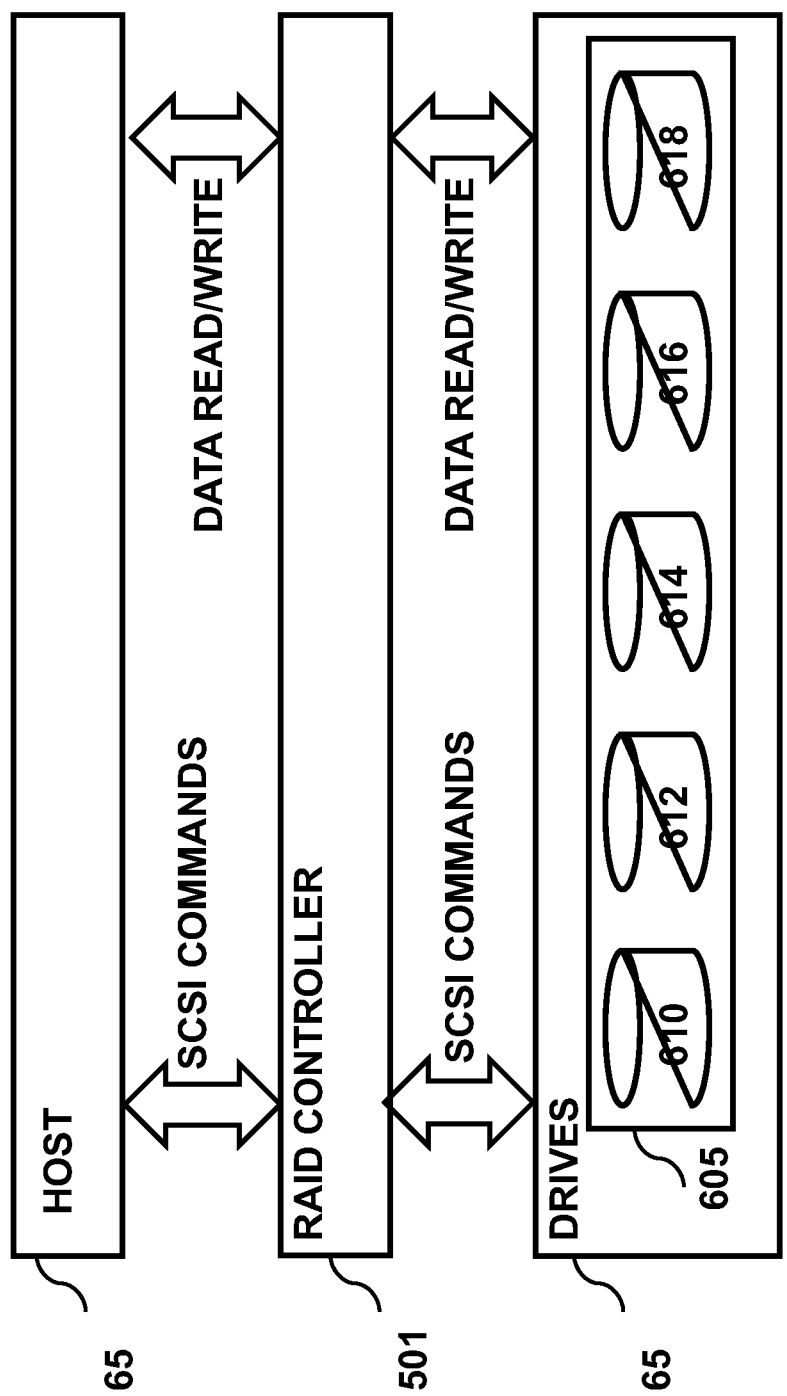
FIG. 6 depicts a high-level exemplary schematic diagram 600 depicting a computer system, according to a preferred embodiment of the present invention.

FIG. 6 depicts a high-level exemplary schematic diagram 600 depicting a computer system, according to a preferred embodiment of the present invention.

Figure 7:
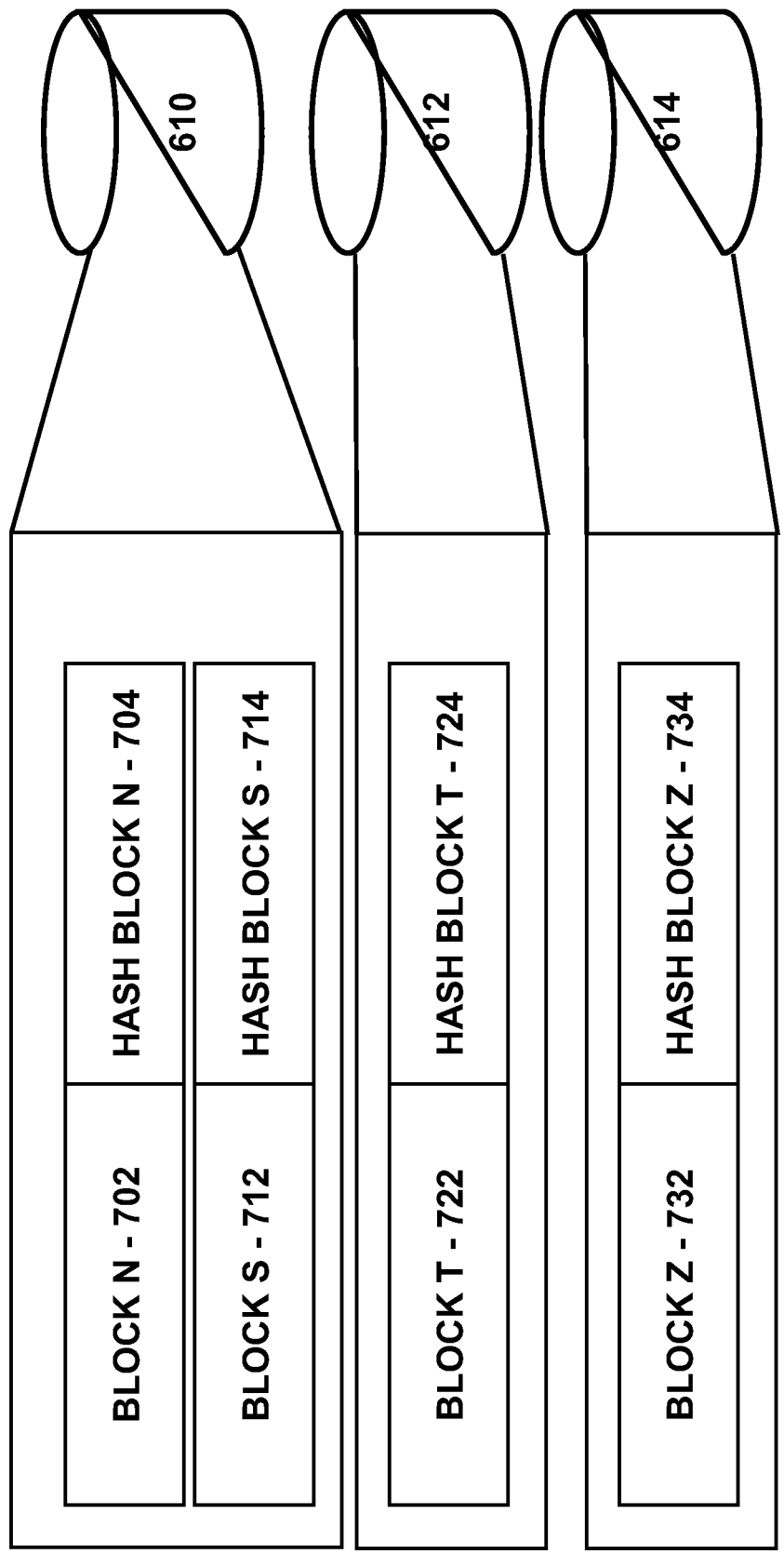
FIG. 7 depicts a high-level exemplary schematic diagram 700 depicting a drive, according to a preferred embodiment of the present invention.

FIG. 7 depicts a high-level exemplary schematic diagram 700 depicting a drive, according to a preferred embodiment of the present invention. FIG. 7 depicts a first drive 610, a second drive 612, and a third drive 614 of the array 605. FIG. 7 does not depict further drives 616, 618 of the array 605. The first drive 610 comprises block N 702 and a hash value of block N 704, and block S 712 and a hash value of block S 714. The value of hash block N 704 is not equal to the value of hash block S 714. The second drive 612 comprises block T 722 and a hash value of block T 724. The value of hash block N 704 is equal to the value of hash block T 724. The third drive 614 comprises block Z 732 and a hash value of block Z 734. The value of hash block N 704 is also equal to the value of hash block Z 734.

FIG. 8 depicts a high-level exemplary schematic diagram 800 depicting entries of the metadata store 508, according to a preferred embodiment of the present invention.

In a preferred embodiment, when data blocks are written to a drive, a cryptographic value is calculated for each block. The cryptographic value 704, 714, 724, 734 is appended to the data block 702, 712, 722, 732 or stored in a separate location, such as, but not limited to, a Log Structured Array. The skilled person would understand that there are many types of cryptographic value. One example is a hash value. Another example is an error correcting code (ECC). In a preferred embodiment, the invention will be described using hash values.

In a RAID array 605 made up of drives 610, 612, 614, 616, 618 that have a common hashing method the RAID controller 501 implements a hash management method 300, 400 to perform operations to improve the reliability of the array 605 based on coordinating the distributed drive hash population.

The RAID controller 501 identifies drives 610, 612, 614 that have hash duplicates $H_X$ for a given drive LBA range and records this knowledge in a RAID metadata store 508 as a hash lookup 805 for array level LBA ranges. The RAID controller 501 also identifies drives 610 that have a unique hash $H_x$ for a given drive LBA range and records this knowledge in the RAID metadata store 508 as the hash lookup 805 for array level LBA ranges.

The basis of this invention depends on having a population of drives 610, 612, 614, 616, 618 that have a common hash policy (e.g. SHA 256 hashing etc.) and hash data 'grain' size (the 'grain' being the number of LBAs used to build each hash entry value typically stored in an LSA). The invention is described in terms of calculating a cryptographic value for a grain size of one data block. However, the skilled person would understand that other size grains of data could be used, for example, calculating the value based on a set of blocks, a stride of blocks, a file, a LUN or a drive.

Parameters can be associated with a hash value. For example, a parameter of drive hash reference count can be used to refer to a number of times that a hash value is used. A parameter of drive hash duration can be used to refer to how long a hash value has been that value. A parameter of drive hash reference stability be used to refer to how often the hash value for a block is changing. The skilled person would understand that many parameters could be used.

The process starts at step 301. At step 305 the scrub component 504 of the RAID controller 501 queries the underlying drives 610, 612, 614, 616, 618 of a supported RAID array 605. A query is performed on the drives 610, 612, 614, 616, 618 using SCSI commands through the SCSI I/O component 406. The query determines information about the drives 610, 612, 614, 616, 618 such as, but not limited to:

the drive hash method and block size (to verify drive population equivalence)
the drive's hash value for a given block LBA
the drive's block LBA value(s) for a given hash
physical spare space
drive hash reference count
drive hash duration
drive hash reference stability At step 310 the scrub component 504 identifies interesting drive blocks N 702, S 712, T 722, Z 732. A drive block N 702, S 712, T 722, Z 732 is interesting if, for example:

a drive 610, 612, 614, 616, 618 is low on physical space
a drive block hash Y 714 is unique and array 605 is not redundant
the drive 610, 612, 614, 616, 618 is predicted to fail and needs to be exchanged At step 315 the scrub component 504 queries each interesting drive block 702, 712, 722, 732 to identify a hash value $H_x$ (for example a 32 digit hex '2738453627181726453a35cbf8627de1' created using an MD5 algorithm) 704, 714, 724, 734.

At step 320 the scrub component 504 queries each array drive 610, 612, 614, 616, 618 to identify associations by identifying a block that matches hash $H_x$ 704, 714, 724, 724.

The scrub component 504 uses identified drive parameters 810 such as drive hash reference count, drive hash duration, and/or drive hash reference stability to make the best choice about which matching drive(s) to use for a given drive hash association. FIG. 8 depicts block N 702 as having parameters A, B, C, D, block T 712 as having parameters C, D, H, J, and block Z as having parameters C, L, M, P. The scrub component 504 compares parameters 810 and associates block N 702 with entry index 1, with block T 724 with entry index 3. FIG. 8 depicts the association between entry index 1 and entry index 3 with the double headed arrow. FIG. 8 also depicts a state where none of the data is stale. Using parameters as a way to allocate equality associations allows for more control over the system to optimise pairings when there are multiple equalities identified.

FIG. 8 depicts the entries in a simple table format for illustration purposes. Other formats can be used, for example, an LSA, or a bitmap. The skilled person would understand that the metadata can be stored in a number of formats, and in a number of locations. By storing the metadata in the RAID controller, the metadata is easily accessible by the RAID controller software and firmware. The association between two data blocks when the hash values are equal can be considered as an 'equality' association.

At step 325 the scrub component 504 stores the drive 610, 612, 614, 616, 618, block LBA, the hash values 704, 714, 724, 734 and associated drive(s) 610, 612, 614, 616, 618 LBA(s) in a metadata store 508 in the RAID controller 501. In this way, the stored metadata 805 can be built by the RAID controller 501 using the hash scrub process 300 that works through the interesting drive LBA ranges to build up hash associations (either as a foreground or a background process). Alternatively, the scrub component 504 first stores hash values are stored in the metadata store, and then processes the hashes to identify associations.

Once the array drive hash population has been established by the scrub process 300 for a single/many/all source drive blocks, the RAID controller 501 manages the array 605. The RAID controller 501 manages the array 605 with a number of functions 405, 410, 415, 420, 425. When managing a first block that that has an association with a second block, it is useful to refer to the first block as a 'source', and the second block as a 'target'.

At step 405 the manage component 508 identifies that a source drive 610 block has been overwritten, so the corresponding LBA association metadata between source drive and target drive is marked as stale.

For example, at step 410 the manage component 508 identifies that a target drive 612 block has been overwritten, so the corresponding LBA association metadata between target drive 612 and source drive 610 is marked as stale. One method of identifying is to use a reverse lookup method, which uses the hash value to identify the source block.

At step 415 the manage component 508 identifies that a source drive 610 is low on physical space as an Error Recovery Procedure (ERP) to improve RAID characteristics. By identifying hash matches 724, 734 on other drives 612 618, blocks on the source 610 can be unmapped, with SCSI read requests from a host 65 directed to target drives 612, 618.

At step 420 the manage component 508 identifies that source drive block hash 714 is unique and that the array 605 is not redundant. When the source drive block hash 714 is unique any association with another data block can be considered as a 'null' association. The manage component 508 initiates a read/write operation from a source data block 712 to a target drive 612, 614, 616, 618 that has spare capacity using a data read/write component 512. Such spare capacity could be 'RAID spare' capacity (i.e., capacity on drives that is designated as spare for a spare takeover or distributed array spare capacity), or it could be a region of unallocated array capacity.

In the event that there are multiple possible target destination drives to copy the unique data, the choice of destination device could be based on a number of factors. For example to:

a destination device with the most spare capacity,
a destination device with the best write endurance metric,
a destination drive with the lowest ongoing workload.

Advantageously, using an intelligent algorithm to determine a destination drive becomes more important for Distributed RAID where there could be hundreds of drives in the array. Typically, a device is a disk, but the skilled person would understand that other storage devices are also possible.

In the event that at step 420 the manage component 508 identifies that source drive block hash 714 is unique, but the array 605 is redundant, there may be no reason to duplicate the source drive block, because in the event of disk failure, the data can be recovered from the redundant array.

At step 425 the manage component 508 identifies that source drive 610 is predicted to fail and needs to be exchanged. The manage component 508 builds up a database of matching target drive hashes for improved post failure rebuild efficiency. The manage component prioritizes copying the data from drives that have unique hashes to other drives that have spare capacity. Advantageously, this allows for quicker rebuilding when needed, because data can be read directly from hashes on other drives rather than doing a full rebuild I/O sequence to generate the rebuild data. A purpose of this prioritization is to reduce and/or smooth out workload on problem drives during a future exchange.

The method ends at step 440.

In an alternative embodiment the metadata store 508 is located, or at least replicated in a further storage location. The drives support external hash references that can be established and removed by the RAID controller 501.

In an alternative embodiment, a hash value W (not depicted) for a data block K (not depicted) is calculated on-the-fly when writing. Hash calculation can, for example, be made at the RAID controller 501, or at the drive 610, 612, 614, 616, 618. The calculated hash value W is compared to hash values 704, 714, 724, 734 already stored in the metadata store 508. If the metadata store 508 already contains hash value W, the block data is already stored elsewhere in the disk array 605 at location J.

In an alternative embodiment, the present invention can be extended to also provide operations to react to medium errors, and/or to perform deduplication operations by using stored hash value comparisons in addition to the operations 405, 410, 415, 420, 425 described above.

In an alternative embodiment, a drive is predicted to fail. Copies of unique data on the failing disk can be made based on the failing drive's unique hashes to avoid needed to do a full rebuild. A database of matching target drive hashes can be built up for post failure rebuild. For source drive unique hashes copies of data can be taken, and written to spare capacity on other drives. Advantageously, rebuild is quicker when needed, because data can be read directly from the hashes on other drives rather than doing a full rebuild 10 sequence to generate rebuild data. In addition, prioritizing copying unique hash data to other drives spare capacity reduces and/or smooths out the workload on the problem drive during a future exchange. This is particularly important when multiple drives could be failing, as multiple problem drives get considered as interesting source drive hashes that are considered for the above methods of hash linkage in RAID metadata and data duplication within the healthy drive population spare capacity.

In an alternative embodiment, in the event of determining a target device from a list of target devices, the first spare storage area is chosen from a list, the list comprising: a device of the storage system with a most spare capacity of the storage system; a device of the storage system with a best write endurance metric of the storage system; and a device of the storage system with a lowest workload of the storage system.

In an alternative embodiment, multiple source drives are predicted to fail, containing a number of respective unique data blocks. in response to the first device and the second device being predicted to fail, copying is prioritized from a source device based on a number of factors. For example, based on how long ago a failure was predicted, and/or how many unique hashes the first device and the second device are associated with.

In an alternative embodiment, the hash lookup 805 is built as a response to a predicted drive failure so that the rebuild for duplicate hashes can be optimized.

In an alternative embodiment, the metadata store 508 is stored as a bitmap. In this embodiment, copy services techniques, such as those used in logical point-in-time snapshot system like IBM Flashcopy® can be used to manage duplications. Bitmaps used in copy services systems can be created by identifying duplications of the hash values as stored in the metadata store 508.

In an alternative embodiment, rather than using hash values, error correcting code (ECC) bits for each block are used. ECC bits are appended to data blocks during initial write to the drive. An ECC, for example, using Reed-Solomon (RS) or BCH methods, is an error correcting code that can detect x bits in a data block, and can correct a number y bits in a data block, where x is greater than y. In an alternative embodiment, hashing is used in conjunction with ECC bits. Hash values can be calculated on data blocks with ECC applied, or ECC can be calculated on data blocks with hash values applied. rather than using hash values, error correcting code (ECC) bits for each block are used.

In an alternative embodiment, a JBOD array is used instead of a RAID array.

In an alternative embodiment, the scrub component 504 compares hash values $H_x$ and associates block N 702 with entry index 1, with block T 722 with entry index 3, and with block Z 732 with entry index 4. By recording multiple associations, in the event that one of the associated blocks changes, the remaining associations are still maintained.

The invention has been described in terms of disk drives. However, the skilled person would understand the invention was equally applicable to other types of storage drives, such as, but not limited to, solid state drives (SSD), and tape drives.

Figure 9:
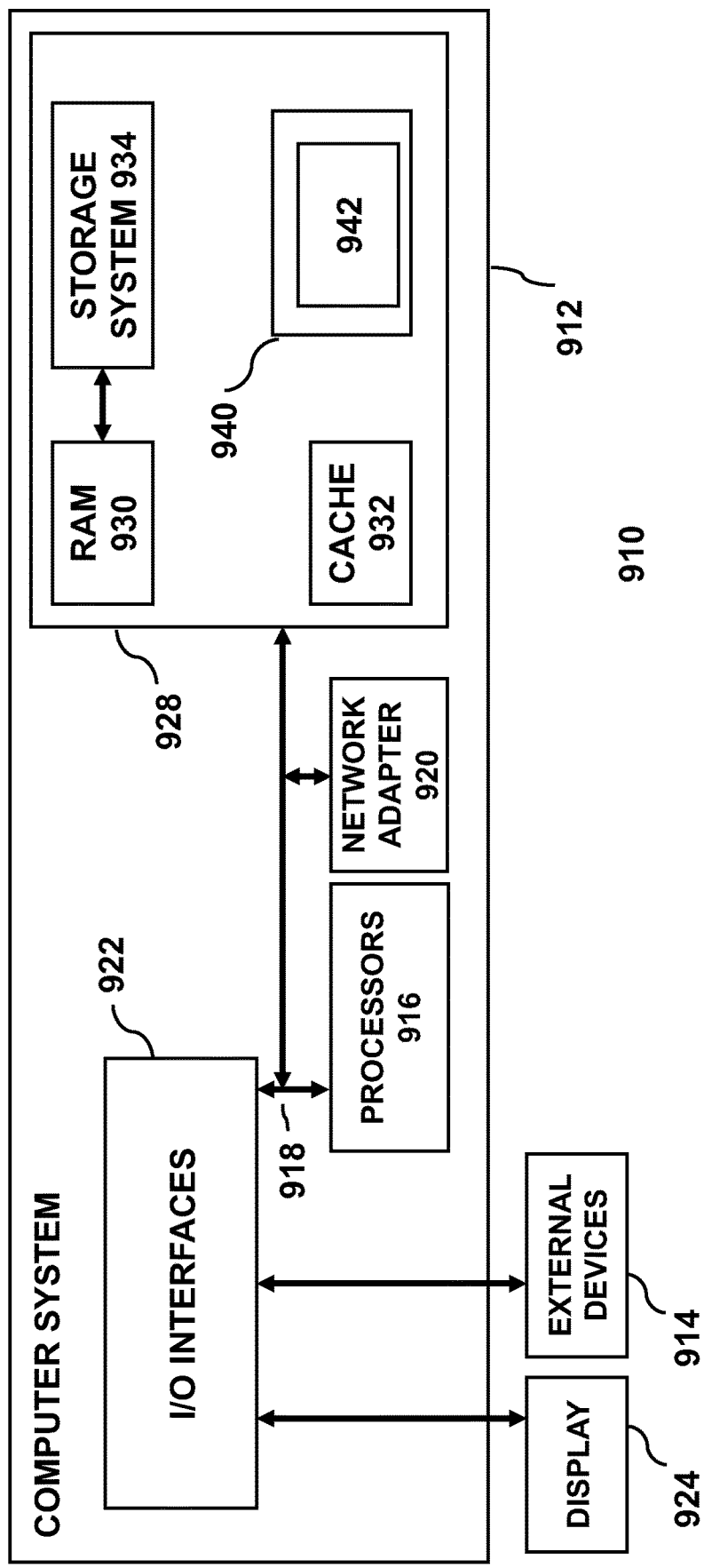
FIG. 9 depicts a computer system in which embodiments of the present invention may be implemented.

FIG. 9 depicts a computer system 912 of Hardware and Software layer 60 in which embodiments of the present invention may be implemented. These concepts are illustrated with reference to FIG. 9, wherein FIG. 9 schematically illustrates an exemplary architecture of a computing node which comprises one or more processor devices and memory devices which implement single ended current sense amplifier circuitry, according to exemplary embodiments of the disclosure. In particular, FIG. 9 illustrates a computing node 910 which comprises a computer system/server 912, which is operational with numerous other general purpose or special purpose computing system environments or configurations. Examples of well-known computing systems, environments, and/or configurations that may be suitable for use with computer system/server 912 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 912 may be described in the general context of computer system executable instructions, such as program modules, being executed by a computer system. Generally, program modules may include routines, programs, objects, components, logic, data structures, and so on that perform particular tasks or implement particular abstract data types. Computer system/server 912 may be practiced in distributed cloud computing environments where tasks are performed by remote processing devices that are linked through a communications network. In a distributed cloud computing environment, program modules may be located in both local and remote computer system storage media including memory storage devices.

In FIG. 9, computer system/server 912 in computing node 910 is shown in the form of a general-purpose computing device. The components of computer system/server 912 may include, but are not limited to, one or more processors 916 or processing units, a system memory 928, and a bus 918 that couples various system components including system memory 928 to the processors 916.

The bus 918 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 912 typically includes a variety of computer system readable media. Such media may be any available media that is accessible by computer system/server 912, and it includes both volatile and non-volatile media, removable and non-removable media.

The system memory 928 can include computer system readable media in the form of volatile memory, such as RAM 930 and/or cache memory 932, wherein the RAM 930 and/or cache memory 932 can implement memory devices. The computer system/server 912 may further include other removable/non-removable, volatile/nonvolatile computer system storage media. By way of example only, storage system 934 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 918 by one or more data media interfaces. As depicted and described herein, memory 928 may include at least one program product having a set (e.g., at least one) of program modules that are configured to carry out the functions of embodiments of the invention.

The program/utility 940, having a set (at least one) of program modules 942, may be stored in memory 928 by way of example, and not limitation, as well as an operating system, one or more application programs, other program modules, and program data. Each of the operating system, one or more application programs, other program modules, and program data or some combination thereof, may include an implementation of a networking environment. Program modules 942 generally carry out the functions and/or methodologies of embodiments of the disclosure as described herein for performing read and write operations of a memory device and configuring constituent components of a memory device.

Computer system/server 912 may also communicate with one or more external devices 914 such as a keyboard, a pointing device, a display 924, etc., one or more devices that enable a user to interact with computer system/server 912, and/or any devices (e.g., network card, modem, etc.) that enable computer system/server 912 to communicate with one or more other computing devices. Such communication can occur via Input/Output (I/O) interfaces 922. Still yet, computer system/server 912 can communicate with one or more networks such as a local area network (LAN), a general wide area network (WAN), and/or a public network (e.g., the Internet) via network adapter 920. As depicted, network adapter 920 communicates with the other components of computer system/server 912 via bus 918. It should be understood that although not shown, other hardware and/or software components could be used in conjunction with computer system/server 912. Examples, include, but are not limited to: microcode, device drivers, redundant processing units, external disk drive arrays, RAID systems, SSD drives, and data archival storage systems, etc.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above invention may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

For the avoidance of doubt, the term "comprising", as used herein throughout the description and claims is not to be construed as meaning "consisting only of".

The invention claimed is:

1. A computer implemented method for managing a storage array in a storage system, the storage array comprising a first data block and a second data block, the method comprising:
   receiving a set of cryptographic values from the storage array, the set of cryptographic values comprising a first value associated with the first data block, and a second value associated with the second data block; and
   analyzing the set of cryptographic values to determine a set of associations, the set of associations comprising a first association between the first data block and the second data block, wherein the analyzing comprises:
      comparing the first value with the second value;
      in response to identifying that the first value equals the second value, determining that the first association is an equality association; and
      in response to identifying that the first value is unique, determining that the first association is a null association;
   storing the set of associations comprising the first association between the first data block and the second data block; and
   in response to determining the set of associations, performing a storage management operation on the storage array.

2. The method of claim 1, wherein in response to the first association being the null association, the storage management operation comprises, in response to the storage array not being redundant, copying the first data block to a spare storage area of the storage system.

3. The method of claim 2, wherein the spare storage area is selected from the group consisting of: a first device of the storage system with a most spare capacity of the storage system, a second device of the storage system with a best write endurance metric of the storage system, and a third device of the storage system with a lowest workload of the storage system.

4. The method of claim 1, wherein the storage array comprises a redundant array of independent disks (RAID) array, wherein in response to the first association being the equality association, the storage management operation comprises, in response to the first data block being on a device of the RAID array that is not available, performing a RAID rebuild of the first data block from the second data block.

5. The method of claim 1, wherein the storage array comprises a third data block and the set of cryptographic values comprises a third value associated with the third data block, wherein the first data block and the second data block are stored on a first device of the system, and the third data block is stored on a second device of the system, wherein the first value is unique, and the second value equals the third value, the method further comprising:
   copying the first data block to a first spare storage of the storage system before copying the second data block to a second spare storage of the storage system.

6. The method of claim 5, wherein the first spare storage area is selected from the group consisting of: a first device of the storage system with a most spare capacity of the storage system, a second device of the storage system with a best write endurance metric of the storage system, and a third device of the storage system with a lowest workload of the storage system.

7. The method of claim 1, wherein the first data block resides on a first device of the storage array, and the second data block resides on a second device of the storage array, and wherein both the first value and second value are unique, the method further comprising, in response to the first device and the second device being predicted to fail, prioritising copying from the first device or the second device based on a metric list, wherein the metric list includes how long ago failure was predicted and how many unique hashes the first device and the second device are associated with.

8. The method of claim 1, further comprising, in response to a device of the storage array being predicted to fail, storing the set of cryptographic values in a database.

9. The method of claim 1, wherein the set of cryptographic values are selected from the group consisting of: a hash value and an error correcting code value.

10. The method of claim 1, wherein the storage array is selected from the group consisting of: a RAID array and a Just a Bunch of Disks (JBOD) array.

11. A system for managing a storage array in a storage system, the storage array comprising a first data block and a second data block, the system comprising:
   a memory;
   at least one processor in communication with memory; and
   program instructions executable by one or more processor via the memory to perform a method comprising:
      receiving a set of cryptographic values from the storage array, the set of cryptographic values comprising a first value associated with the first data block, and a second value associated with the second data block; and
      analyzing the set of cryptographic values to determine a set of associations, the set of associations comprising a first association between the first data block and the second data block, wherein the analyzing comprises:
         comparing the first value with the second value;
         in response to identifying that the first value equals the second value, determining that the first association is an equality association; and in response to identifying that the first value is unique, determining that the first association is a null association;

storing the set of associations comprising the first association between the first data block and the second data block; and in response to determining the set of associations, performing a storage management operation on the storage array.

12. The system of claim 11, wherein in response to the first association being the null association, the storage management operation comprises, in response to the storage array not being redundant, copying the first data block to a spare storage area of the storage system.

13. The system of claim 12, wherein the spare storage area is selected from the group consisting of a drive of the storage system with a most spare capacity of the storage system, a drive of the storage system with a best write endurance metric of the storage system, and a drive of the storage system with a lowest workload of the storage system.

14. The system of claim 11, wherein in response to the first association being the equality association, the storage management operation comprises, in response to the first data block not being available, rebuilding the first data block from the second data block.

15. The system of claim 11, wherein the storage array comprises a third data block and the set of cryptographic values comprises a third value associated with the third data block, wherein the first data block and the second data block are stored on a first device of the system, and the third data block is stored on a second device of the system, wherein the first value is unique, and the second value equals the third value, the program instructions executable by the one or more processor via the memory further for performing the method comprising:

copying the first data block to a first spare storage of the storage system before copying the second data block to a second spare storage of the storage system.

16. The system of claim 15, wherein the first spare storage area is selected from the group consisting of: a first device of the storage system with a most spare capacity of the storage system, a second device of the storage system with a best write endurance metric of the storage system, and a third device of the storage system with a lowest workload of the storage system.

17. The system of claim 11, wherein the first data block resides on a first device of the storage array, and the second data block resides on a second device of the storage array, and wherein both the first value and second value are unique, the method further comprising, in response to the first device and the second device being predicted to fail, prioritising copying from the first device or the second device based on a metric list, wherein the metric list includes how long ago failure was predicted and how many unique hashes the first device and the second device are associated with.

18. The system of claim 11, further comprising, in response to a device of the storage array being predicted to fail, storing the set of cryptographic values in a database.

19. The system of claim 11, wherein the set of cryptographic values are selected from the group consisting of: a hash value and an error correcting code value.

20. A computer program product for managing a storage array in a storage system, the storage array comprising a first data block and a second data block, comprising:

a computer readable storage medium readable by one or more processing circuit and storing instructions for execution by one or more processor for performing a method comprising:

receiving a set of cryptographic values from the storage array, the set of cryptographic values comprising a first value associated with the first data block, and a second value associated with the second data block; and analyzing the set of cryptographic values to determine a set of associations, the set of associations comprising a first association between the first data block and the second data block, wherein the analyzing comprises:

comparing the first value with the second value;

in response to identifying that the first value equals the second value, determining that the first association is an equality association; and in response to identifying that the first value is unique, determining that the first association is a null association;

storing the set of associations comprising the first association between the first data block and the second data block; and in response to determining the set of associations, performing a storage management operation on the storage array.

* * * * *